United States Patent
Ichikawa

(10) Patent No.: US 8,423,209 B2
(45) Date of Patent: Apr. 16, 2013

(54) VEHICLE HAVING POWER STORAGE DEVICES AND CHARGING LINE FOR SUPPLYING ELECTRIC POWER PROVIDED FROM OUTSIDE VEHICLE

(75) Inventor: Shinji Ichikawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 710 days.

(21) Appl. No.: 12/451,606

(22) PCT Filed: Jul. 7, 2008

(86) PCT No.: PCT/JP2008/062649
§ 371 (c)(1),
(2), (4) Date: Nov. 20, 2009

(87) PCT Pub. No.: WO2009/011322
PCT Pub. Date: Jan. 22, 2009

(65) Prior Publication Data
US 2010/0076636 A1   Mar. 25, 2010

(30) Foreign Application Priority Data
Jul. 13, 2007   (JP) .................................. 2007-184611

(51) Int. Cl.
B60K 1/00   (2006.01)
B60W 10/24   (2006.01)
H02J 7/00   (2006.01)
(52) U.S. Cl.
USPC ............................. 701/22; 320/116; 180/65.1
(58) Field of Classification Search .................... 701/22; 180/65.1, 65.29; 320/116–121
See application file for complete search history.

(56) References Cited

U.S. PATENT DOCUMENTS

| 7,352,154 B2 * | 4/2008 | Cook .......................... 320/116 |
| 2003/0081440 A1 | 5/2003 | Komatsu et al. |
| 2003/0107352 A1 | 6/2003 | Downer et al. |
| 2007/0029986 A1 | 2/2007 | Nakamura et al. |
| 2007/0073455 A1 | 3/2007 | Oyobe et al. |

FOREIGN PATENT DOCUMENTS

| JP | A-2003-134606 | 5/2003 |
| JP | A-2003-209969 | 7/2003 |
| JP | A-2005-57826 | 3/2005 |
| JP | A-2007-49792 | 2/2007 |
| JP | A-2007-94867 | 4/2007 |
| JP | A-2007-143266 | 6/2007 |

OTHER PUBLICATIONS

International Search Report issued in International Application No. PCT/JP2008/062649; Mailed Aug. 12, 2008.

* cited by examiner

Primary Examiner — Thomas Tarcza
Assistant Examiner — Adam Tissot
(74) Attorney, Agent, or Firm — Oliff & Berridge, PLC

(57) ABSTRACT

A vehicle (1) includes a plurality of chargeable and dischargeable batteries (B1, B2), a load device, a bus for supplying electric power to the load device, a plurality of voltage step-up converters (12-1, 12-2) provided in association with a plurality of batteries (B1, B2) respectively, a charging line (PCL) for supplying electric power provided from outside the vehicle to a connection point of the first battery (B1) and the first voltage step-up converter (12-1), and a control device (30). When charging from an external source is started, the control device (30) causes the first voltage step-up converter (12-1) to perform a rectifying operation for supplying electric current from the charging line to the bus in a case where a voltage of the bus is lower than a voltage of the charging line, and causes the first voltage step-up converter (12-2) to connect the bus and the second battery (B2).

7 Claims, 9 Drawing Sheets

FIG.5

| INPUT | | | OUTPUT | | |
|---|---|---|---|---|---|
| GATE BLOCK STATE CSDN2 | UPPER-ARM ON STATE U-ON2 | VOLTAGE STEP-UP COMMAND VALUE Vh* | UPPER ARM (Q2A) | LOWER ARM (Q2B) | UPPER-ARM ON FLAG F2 |
| GATE BLOCK STATE — VALID | — | — | OFF | OFF | 0 |
| UPPER-ARM ON STATE — INVALID | VALID | — | ON-FIXED | OFF-FIXED | 1 |
| INVALID | INVALID | COMMAND VALUE | ON/OFF SWITCHING AT DUTY RATIO ACCORDING TO VOLTAGE STEP-UP COMMAND VALUE | | 0 |

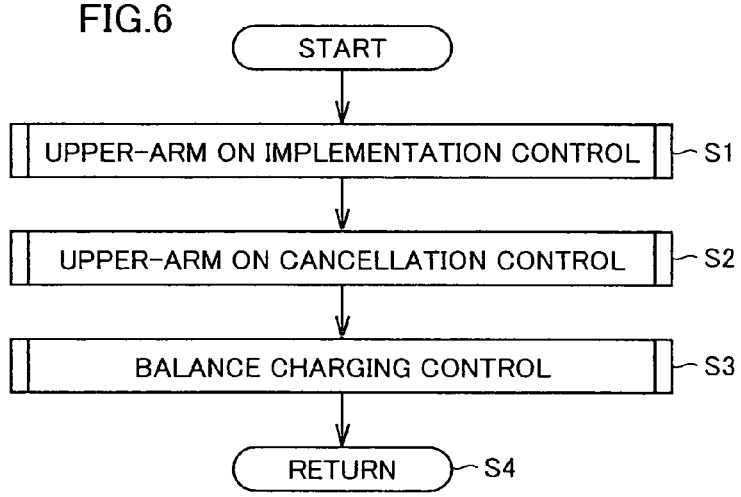

FIG.6

START
↓
UPPER-ARM ON IMPLEMENTATION CONTROL — S1
↓
UPPER-ARM ON CANCELLATION CONTROL — S2
↓
BALANCE CHARGING CONTROL — S3
↓
RETURN — S4

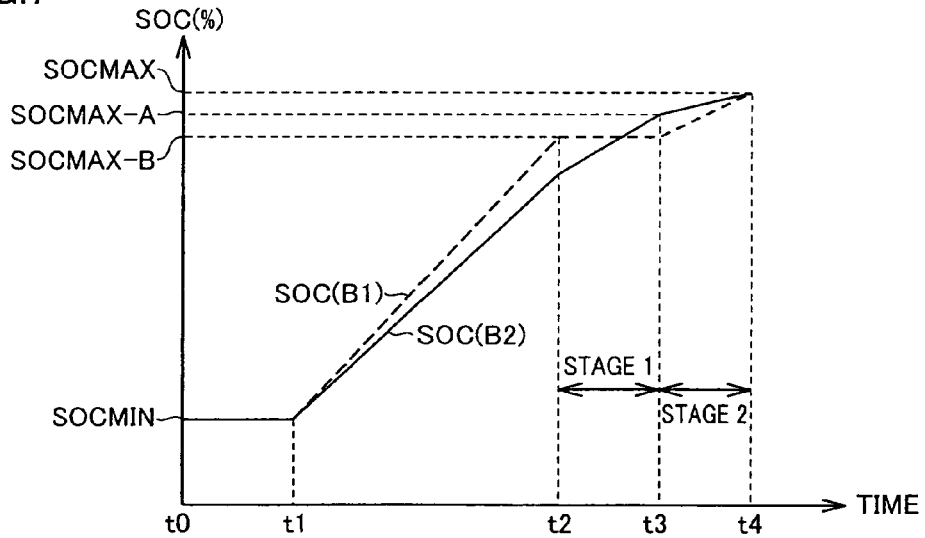

FIG.7

VEHICLE HAVING POWER STORAGE DEVICES AND CHARGING LINE FOR SUPPLYING ELECTRIC POWER PROVIDED FROM OUTSIDE VEHICLE

TECHNICAL FIELD

The present invention relates to a vehicle, and particularly to a vehicle configured to be externally chargeable and mounted with a plurality of power storage devices.

BACKGROUND ART

In recent years, hybrid vehicles using both of a motor and an engine for driving wheels have been of interest as environment-friendly vehicles. Such hybrid vehicles include those under study that are mounted with a plurality of batteries.

Japanese Patent Laying-Open No. 2003-209969 discloses a hybrid vehicle mounted with a plurality of batteries. A power control system for an electric traction motor in the vehicle includes at least one inverter for providing conditioned electrical power to the electric traction motor, and a plurality of power stages for providing DC power to said at least one inverter, where each stage includes a battery and a boost/buck DC-DC converter, and said power stages are wired in parallel. The power stages are controlled to maintain an output voltage to said at least one inverter.

A hybrid vehicle chargeable from an external source is also under study. Such a vehicle may be charged at home for example, so that the frequency of replenishment with fuel at a gas station decreases, which is convenient for the driver. Further, more cost-effective midnight power for example may be used, so that an advantage in terms of the cost is achieved.

The charging efficiency in home charging for example, however could be deteriorated due to generation of heat and the like. In order to improve the overall energy efficiency, it is necessary to keep small the loss in charging from an external source.

DISCLOSURE OF THE INVENTION

An object of the present invention is to provide a vehicle mounted with a plurality of power storage devices, having an improved charging efficiency in charging from an external source.

In summary, the present invention is a vehicle including: first and second chargeable and dischargeable power storage devices; a load device; an electric power line for supplying electric power to the load device; first and second voltage conversion devices provided in association with the first and second power storage devices respectively and each connected between respective associated power storage device and the electric power line; a charging line for supplying electric power provided from outside the vehicle to a connection point of the first power storage device and the first voltage conversion device; and a control device controlling the first and second voltage conversion devices. When external charging from an external source via the charging line is started, the control device causes the first voltage conversion device to perform a rectifying operation for supplying an electric current from the charging line to the electric power line in a case where a voltage of the electric power line is lower than a voltage of the charging line, and causes the second voltage conversion device to connect the electric power line and the second power storage device.

Preferably, the first and second voltage conversion devices each include a chopper circuit having an upper arm where a switching element and a rectifying element are connected in parallel. When the external charging is started, the control device fixes the switching element in the first voltage conversion device in a non-conductive state and fixes the switching element in the second voltage conversion device in a conductive state.

More preferably, the electric power line includes a positive bus and a negative bus. The chopper circuit further includes: an inductor having one end connected to a positive electrode of the associated power storage device; and a lower arm connected between the other end of the inductor and the negative bus. The upper arm is connected between the other end of the inductor and the positive bus. The rectifying element has a forward direction from the other end of the inductor toward the positive bus, and the rectifying element is provided in parallel with the switching element.

Preferably, when a state amount indicating a state of charge of the first power storage device is closer to a full charge state relative to a first predetermined value after the external charging is started, the control device causes the second voltage conversion device to operate such that a state amount indicating a state of charge of the second power storage device increases.

More preferably, when the state amount indicating the state of charge of at least one of the first and second power storage devices is closer to the full charge state relative to a second predetermined value after the external charging is started, the control device causes the first and second voltage conversion devices to operate together such that the states of the first and second power storage devices are equal to each other. The second predetermined value indicates a state amount closer to the full charge state relative to the first predetermined value.

Preferably, the load device includes an electric motor used for driving the vehicle, and the vehicle further includes an internal combustion engine used together with the electric motor for driving the vehicle.

More preferably, the vehicle further includes a charger configured to be connectable to a power supply outside the vehicle and converting electric power received from the power supply to generate a charging voltage on the charging line.

In accordance with the present invention, in the case where the vehicle is charged from a source outside the vehicle, a plurality of power storage devices can be charged while the loss kept small.

BRIEF DESCRIPTION OF THE DRAWINGS

FIG. 5 is a diagram illustrating an operation of converter control unit 32-2 in FIG. 4.

FIG. 6 is a flowchart illustrating control performed by an HV-ECU 31 in FIG. 3.

FIG. 7 is a diagram showing a change in state of charge SOC of batteries B1, B2 when charging from an external source is performed.

BEST MODES FOR CARRYING OUT THE INVENTION

Figure 1:
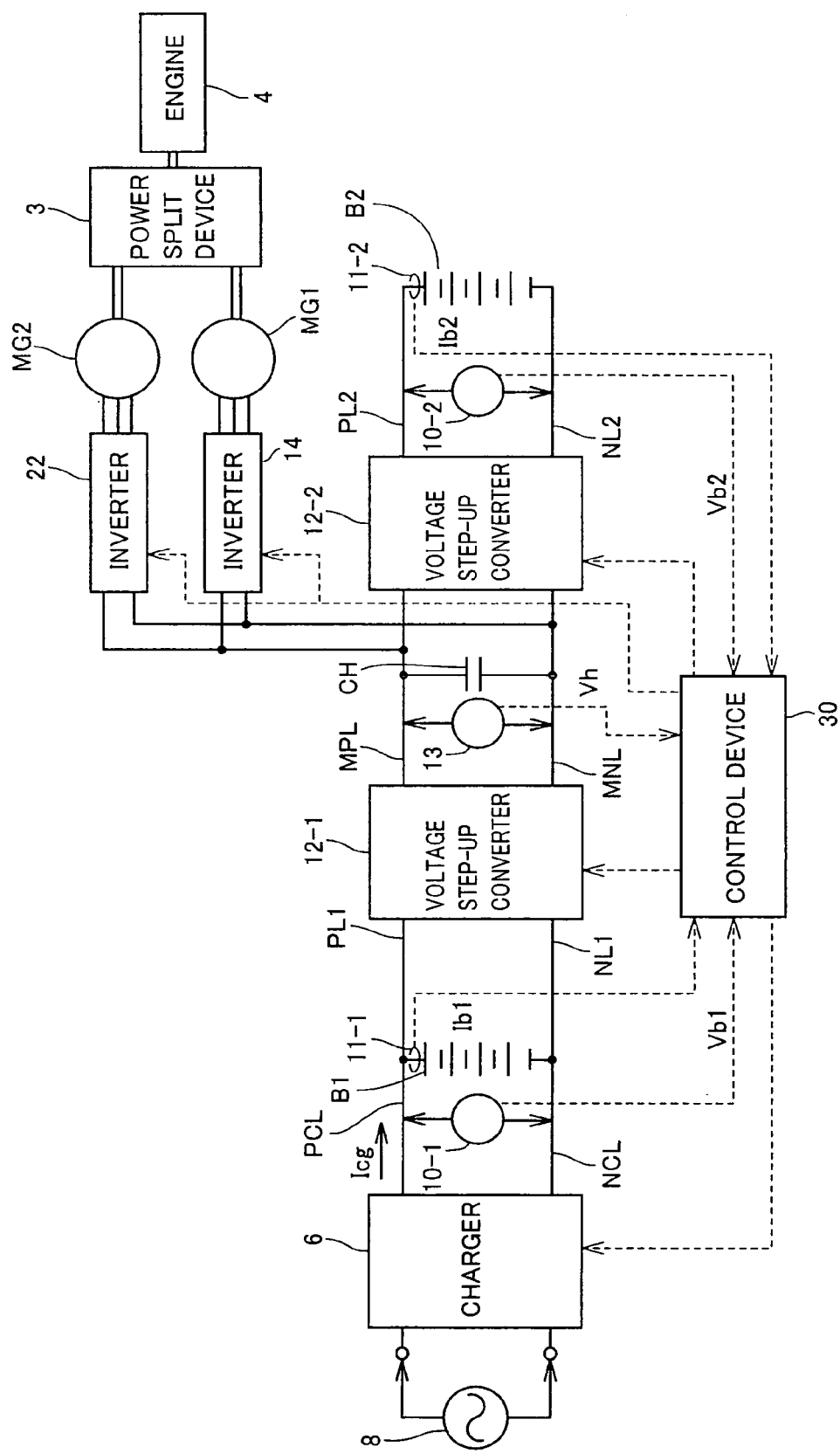
FIG. 1 is a diagram showing a main configuration of a vehicle 1 according to an embodiment of the present invention.

In the following, embodiments of the present invention will be described with reference to the drawings. Here, like or corresponding components in the drawings are denoted by like reference characters, and a description thereof will not be repeated.

FIG. 1 is a diagram showing a main configuration of a vehicle 1 in an embodiment of the present invention.

Referring to FIG. 1, vehicle 1 includes batteries B1, B2 that are power storage devices, voltage step-up converters 12-1, 12-2 that are electric power converters, a smoothing capacitor CH, voltage sensors 10-1, 10-2, 13, inverters 14, 22, an engine 4, motor generators MG1, MG2, a power split device 3, and a control device 30.

The power storage devices mounted on this vehicle can be charged from an external source. In order to adapt to the external charging, vehicle 1 further includes a charger 6 having a connector connectable to a commercial power supply 8 of AC 100 V or 200 V for example, and connected by charging lines PCL, NCL to a positive line PL1 and a negative line NL1 respectively. Charger 6 converts AC to DC and regulates the voltage to supply the voltage to a battery. For adaptation to the external charging, another system such as a system in which a neutral point of stator coils in motor generators MG1, MG2 is connected to an AC power supply or a system in which voltage step-up converters 12-1, 12-2 are used in combination to serve as an AC-DC converter may also be used.

Smoothing capacitor CH smoothes a voltage stepped up by voltage step-up converters 12-1, 12-2. Voltage sensor 13 detects terminal-to-terminal voltage Vh of smoothing capacitor CH to output the voltage to control device 30.

Inverter 14 converts DC voltage Vh supplied from voltage step-up converter 12-1 or 12-2 into a three-phase AC voltage to output the voltage to motor generator MG1. Inverter 22 converts DC voltage Vh supplied from voltage step-up converter 12-1 or 12-2 into a three-phase AC voltage to output the voltage to motor generator MG2.

Power split device 3 is coupled to engine 4 and motor generators MG1, MG2 to split motive power between the engine and generators. For example, as power split device 3, a planetary gear train having three rotational shafts for a sun gear, a planetary carrier and a ring gear may be used. In the planetary gear train, as the revolutions of two of the three rotational shafts are determined, the revolution of the remaining one rotational shaft is uniquely determined. The three rotational shafts are connected to respective rotational shafts of engine 4 and motor generators MG1, MG2 respectively. Here, the rotational shaft of motor generator MG2 is coupled to wheels by a reduction gear and a differential gear (not shown). A reduction unit for the rotational shaft of motor generator MG2 may be further incorporated into power split device 3.

Battery B1 has its positive electrode connected to positive line PL1 and its negative electrode connected to negative line NL1. Voltage sensor 10-1 measures voltage Vb1 between the positive electrode and the negative electrode of battery B1. A current sensor 11-1 detecting current Ib1 flowing through battery B1 is provided in order to monitor a state of charge SOC1 of battery B1 together with voltage sensor 10-1. State of charge SOC1 of battery B1 is also detected by control device 30. Control device 30 calculates state of charge SOC1 based on an open circuit voltage of battery B1 and an integral of current Ib1 flowing through battery B1. A secondary battery such as lead-acid battery, nickel-metal hydride battery, lithium-ion battery or the like, or a large-capacity capacitor such as electrical double layer capacitor or the like, may be used for example as battery B1.

Battery B2 has its positive electrode connected to a positive line PL2 and its negative electrode connected to a negative line NL2. Voltage sensor 10-2 measures voltage Vb2 between the terminals of battery B2. A current sensor 11-2 detecting current Ib2 flowing through battery B2 is provided in order to monitor a state of charge SOC2 of battery B2 together with voltage sensor 10-2. State of charge SOC2 of battery B2 is also detected by control device 30. Control device 30 calculates state of charge SOC2 based on an open circuit voltage of battery B2 and an integral of current Ib2 flowing through battery B2. A secondary battery such as lead-acid battery, nickel-metal hydride battery, lithium-ion battery or the like, or a large-capacity capacitor such as electrical double layer capacitor or the like, may be used for example as battery B2.

As for battery B2 and battery B1, the capacity, namely an amount of power that can be stored in the batteries each is set such that an allowable maximum power can be output to electrical loads (inverter 22 and motor generator MG2) connected between a main positive bus MPL and a main negative bus MNL by simultaneously using the batteries for example. Thus, the vehicle can run with the maximum power in an EV (electric vehicle) mode travel without using the engine.

When the electric power of battery B2 is exhausted, engine 4 may be used in addition to battery B1 so that the vehicle can travel with the maximum power without using battery B2.

Inverter 14 is connected to main positive bus MPL and main negative bus MNL. Inverter 14 receives a stepped up voltage from voltage step-up converters 12-1 and 12-2 to drive motor generator MG1 for the purpose of for example starting engine 4. Further, inverter 14 returns, to voltage step-up converters 12-1 and 12-2, electric power generated by motor generator MG1 from the motive power transmitted from engine 4. At this time, voltage step-up converters 12-1 and 12-2 are controlled by control device 30 such that the converters operate as voltage conversion circuits converting voltage Vh into voltages Vb1, Vb2 respectively.

Inverter 22 is connected in parallel with inverter 14 to main positive bus MPL and main negative bus MNL. Inverter 22 converts a DC voltage that is output from voltage step-up converters 12-1 and 12-2 into a three-phase AC voltage to output the voltage to motor generator MG2 driving wheels. In regenerative braking, inverter 22 returns electric power generated by motor generator MG2 to voltage step-up converters 12-1 and 12-2. At this time, voltage step-up converters 12-1 and 12-2 are controlled by control device 30 such that the converters serve as voltage conversion circuits converting voltage Vh into voltages Vb1, Vb2 respectively.

Control device 30 receives a torque command value, a motor current value and a revolution number of motor generators MG1, MG2 each, respective values of voltages Vb1, Vb2, Vh and a start signal. Control device 30 outputs to voltage step-up converters 12-1, 12-2, an instruction to step up the voltage, an instruction to step down the voltage and an instruction of inhibiting the operation.

Further, control device 30 outputs, to inverter 14, a drive instruction to convert DC voltage Vh which is the output of voltage step-up converters 12-1, 12-2 into an AC voltage for driving motor generator MG1, and a regenerative instruction to convert an AC voltage generated by motor generator MG1 into DC voltage Vh and return the voltage to voltage step-up converters 12-1, 12-2.

Similarly, control device 30 outputs, to inverter 22, a drive instruction to convert the DC voltage into an AC voltage for driving motor generator MG2, and a regenerative instruction to convert an AC voltage generated by motor generator MG2 into a DC voltage and return the voltage to voltage step-up converters 12-1, 12-2.

Figure 2:
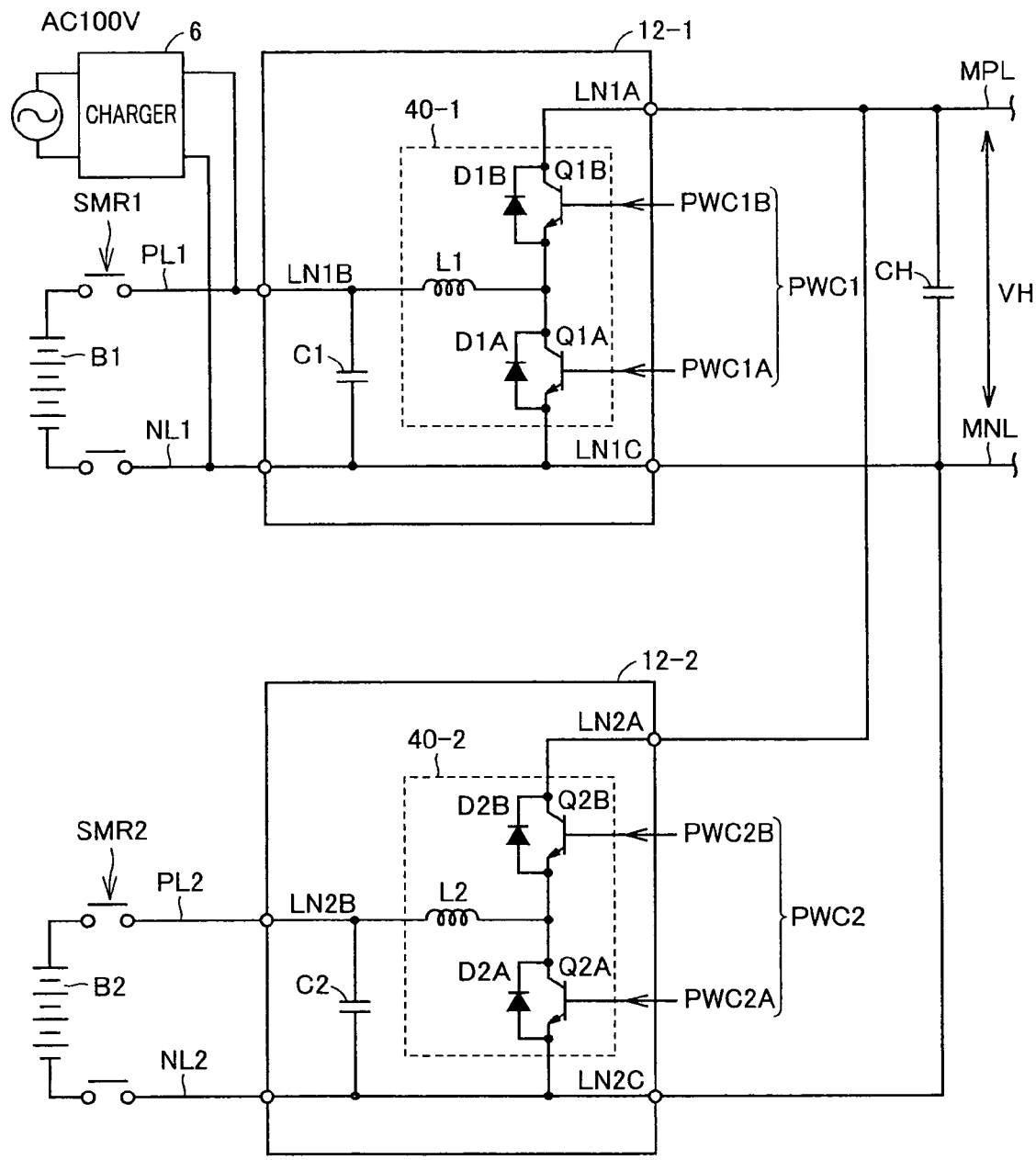
FIG. 2 is a schematic diagram showing a configuration of voltage step-up converters 12-1, 12-2 shown in FIG. 1.

FIG. 2 is a schematic diagram showing a configuration of voltage step-up converters 12-1, 12-2.

Referring to FIG. 2, voltage step-up converter 12-1 includes a chopper circuit 40-1, a positive bus LN1A, a negative bus LN1C, a line LN1B, and a smoothing capacitor C1. Chopper circuit 40-1 includes transistors Q1A, Q1B, diodes D1A, D1B and an inductor L1. Transistor Q1B and diode D1B form an upper arm. Transistor Q1A and diode D1A form a lower arm.

Positive bus LN1A has one end connected to the collector of transistor Q1B and the other end connected to main positive bus MPL. Negative bus LN1C has one end connected to negative line NL1 and the other end connected to main negative bus MNL.

Transistors Q1A, Q1B are connected in series between negative bus LN1C and positive bus LN1A. Specifically, the emitter of transistor Q1A is connected to negative bus LN1C, the emitter of transistor Q1B is connected to the collector of transistor Q1A, and the collector of transistor Q1B is connected to positive bus LN1A. In the lower arm, diode D1A is connected in parallel with transistor Q1A. In the upper arm, diode D1B is connected in parallel with transistor Q1B. The forward direction of diode D1A is the direction from bus LN1C toward inductor L1. The forward direction of diode D1B is the direction from inductor L1 toward bus LN1A. Inductor L1 has one end connected to a connection node of transistor Q1A and transistor Q1B.

Line LN1B is connected between positive line PL1 and the other end of inductor L1. Smoothing capacitor C1 is connected between line LN1B and negative bus LN1C and reduces an AC component included in the DC voltage between line LN1B and negative bus LN1C.

Positive line PL1 and negative line NL1 are connected by a system main relay SMR1 to the positive electrode and the negative electrode of battery B1 respectively.

In response to drive signal PWC1 provided from control device 30 in FIG. 1, chopper circuit 40-1 can step up DC power (drive power) received from positive line PL1 and negative line NL1 to supply the resultant voltage to main positive bus MPL and main negative bus MNL, and step down the voltage of main positive bus MPL and main negative bus MNL to supply the resultant voltage to battery B1.

Voltage step-up converter 1-2-2 includes a chopper circuit 40-2, a positive bus LN2A, a negative bus LN2C, a line LN2B, and a smoothing capacitor C2. Chopper circuit 40-2 includes transistors Q2A, Q2B, diodes D2A, D2B and an inductor L2. Transistor Q2B and diode D2B form an upper arm. Transistor Q2A and diode D2A form a lower arm.

Positive bus LN2A has one end connected to the collector of transistor Q2B and the other end connected to main positive bus MPL. Negative bus LN2C has one end connected to negative line NL2 and the other end connected to main negative bus MNL.

Transistors Q2A, Q2B are connected in series between negative bus LN2C and positive bus LN2A. Specifically, the emitter of transistor Q2A is connected to negative bus LN2C, the emitter of transistor Q2B is connected to the collector of transistor Q2A, and the collector of transistor Q2B is connected to positive bus LN2A. In the lower arm, diode D2A is connected in parallel with transistor Q2A. In the upper arm, diode D2B is connected in parallel with transistor Q2B. The forward direction of diode D2A is the direction from bus LN2C toward inductor L2. The forward direction of diode D2B is the direction from inductor L2 toward bus LN2A. Inductor L2 is connected to a connection node of transistor Q2A and transistor Q2B.

Here, transistors Q1B, Q1A, Q2A, Q2B each may be a power switching device, and an IGBT (Insulated Gate Bipolar Transistor) device, power MOSFET (Metal-Oxide Semiconductor Field-Effect Transistor) or the like may be used as the transistors.

Line LN2B has one end connected to positive line PL2 and the other end connected to inductor L2. Smoothing capacitor C2 is connected between line LN2B and negative bus LN2C and reduces an AC component included in the DC voltage between line LN2B and negative bus LN2C.

Positive line PL2 and negative line NL2 are connected by a system main relay SMR2 to the positive electrode and the negative electrode of battery B2 respectively.

In response to drive signal PWC2 provided from control device 30 in FIG. 1, chopper circuit 40-2 can step up DC power (drive power) received from positive line PL2 and negative line NL2 to supply the resultant voltage to main positive bus MPL and main negative bus MNL, and step down the voltage of main positive bus MPL and main negative bus MNL to supply the resultant voltage to battery B2.

In the following, a voltage converting operation (voltage step-up operation) of voltage step-up converter 12-1 will be described. Control device 30 turns on/off transistor Q1A at a predetermined duty ratio. At this time, transistor Q1B is kept off or rendered conductive complementarily to transistor Q1A. While transistor Q1A is in the ON state, a pump current flows from battery B1 successively through line LN1B, inductor L1, transistor Q1A and negative bus LN1C. With this pump current, inductor L1 stores electromagnetic energy.

When transistor Q1A changes from the ON state to the OFF state, inductor L1 superimposes the stored electromagnetic energy on a discharging current. While transistor Q1A is in the OFF state, the discharging current flows from battery B1 successively through line LN1B, inductor L1, diode D1B and main bus LN1A to main positive bus MPL.

Consequently, the average voltage of the DC power supplied from voltage step-up converter 12-1 to main positive bus MPL and main negative bus MNL is stepped up by a voltage corresponding to the electromagnetic energy stored by inductor L1 according to the duty ratio.

In order to control such a voltage converting operation of voltage step-up converter 12-1, control device 30 generates drive signal PWC1 including drive signal PWC1A for controlling ON/OFF of transistor Q1A and drive signal PWC1B for controlling ON/OFF of transistor Q1B.

Here, voltage step-up converter 12-2 operates similarly to voltage step-up converter 12-1, and the description thereof will not be repeated here.

Figure 3:
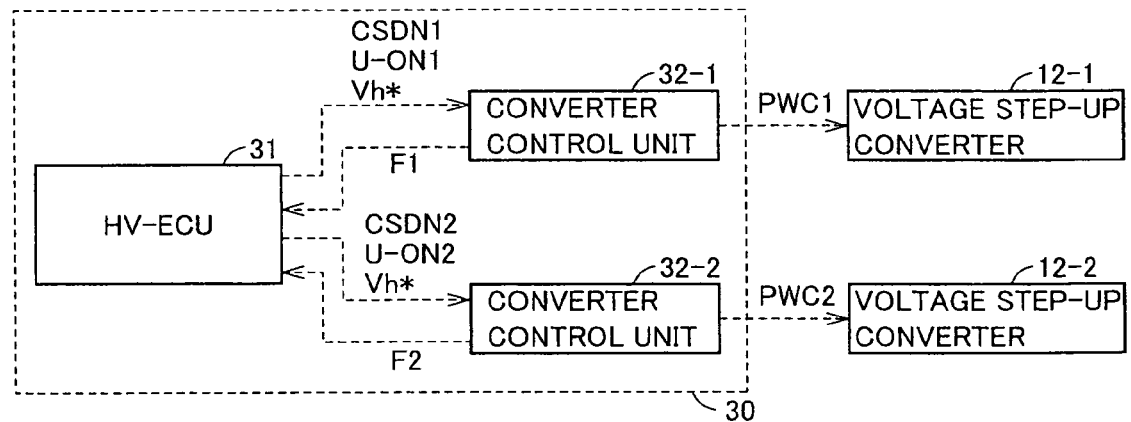
FIG. 3 is a block diagram showing a configuration of a control device 30 in FIG. 1, associated with voltage step-up converters 12-1, 12-2.

FIG. 3 is a block diagram showing a configuration associated with voltage step-up converters 12-1, 12-2 of control device 30 in FIG. 1.

Referring to FIG. 3, control device 30 includes an HV-ECU (Hybrid Electric Unit) 31 performing main control for the hybrid vehicle, a converter control unit 32-1 controlling voltage step-up converter 12-1 and a converter control unit 32-2 controlling voltage step-up converter 12-2. Control device 30 also includes a configuration (not shown) for controlling engine 4 and inverters 14, 22 in FIG. 1.

HV-ECU 31 outputs voltage step-up command value Vh*, gate block command CSDN1 and upper-arm ON command U-ON1 to converter control unit 32-1. Converter control unit 32-1 outputs drive signal PWC1 to voltage step-up converter 12-1. Converter control unit 32-1 internally sets flag F1 indicating the current control state of the converter control unit itself, and the HV-ECU can read flag F1 from converter control unit 32-1 to check the operational state of converter control unit 32-1.

HV-ECU 31 outputs voltage step-up command value Vh*, gate block command CSDN2 and upper-arm ON command U-ON2 to converter control unit 32-2. Converter control unit 32-2 outputs drive signal PWC2 to voltage step-up converter 12-2. Converter control unit 32-2 internally sets flag F2 indicating the current control state of the converter control unit itself, and the HV-ECU can read flag F2 from converter control unit 32-2 to check the operational state of converter control unit 32-2.

Figure 4:
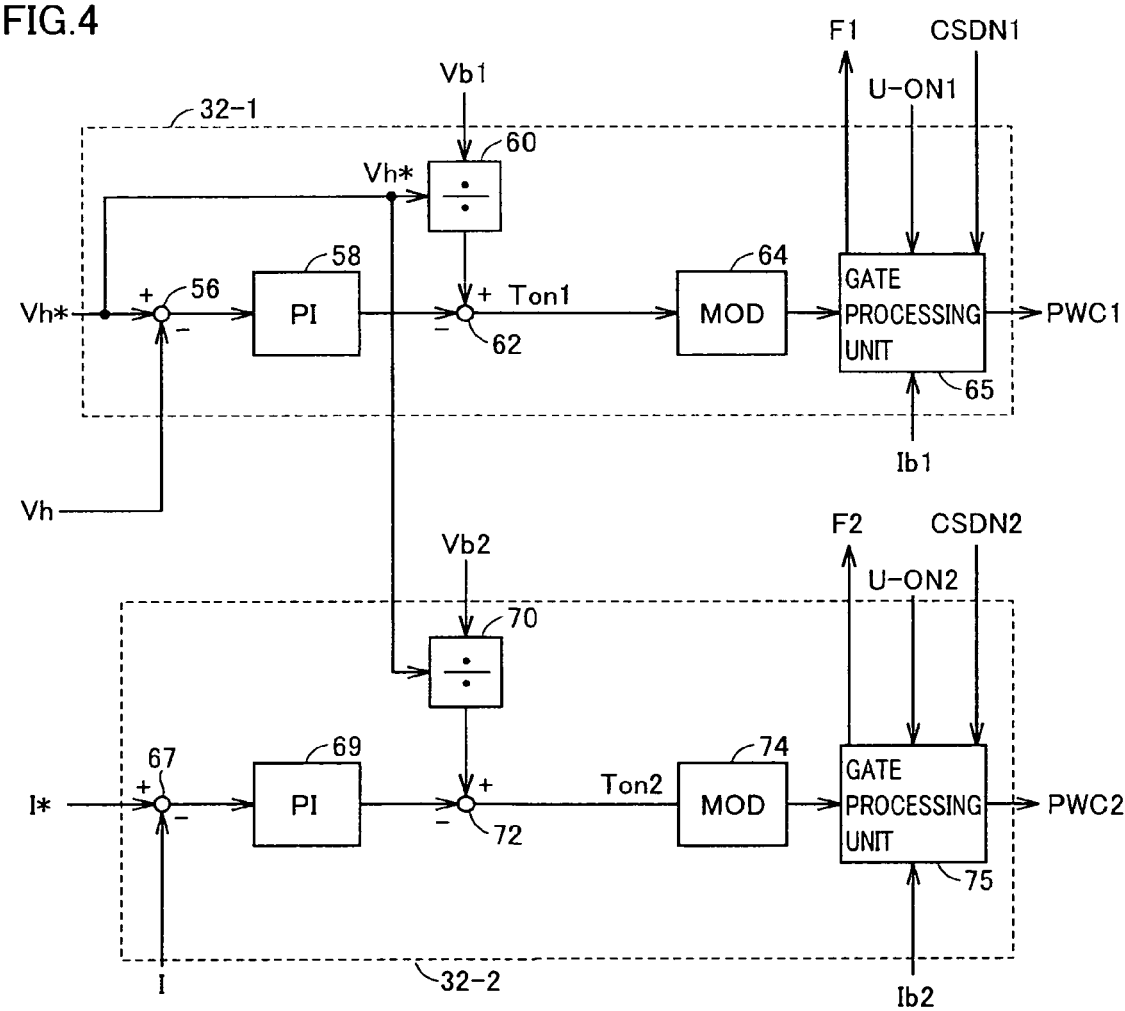
FIG. 4 is a functional block diagram of converter control units 32-1, 32-2 in FIG. 3.

FIG. 4 is a functional block diagram of converter control units 32-1, 32-2 in FIG. 3.

Referring to FIG. 4, converter control unit 32-1 includes subtractor units 56, 62, a proportional-integral control unit 58, a divider unit 60, a modulation unit 64, and a gate processing unit 65.

Subtractor unit 56 subtracts voltage Vh from target voltage Vh* that is output from HV-ECU 31, and outputs the result of subtraction to proportional-integral control unit 58. Proportional-integral control unit 58 uses a difference between target voltage Vh* and voltage Vh as an input to perform proportional integration thereon, and outputs the result of proportional integration to subtractor unit 62. Here, subtractor unit 56 and proportional-integral control unit 58 form a voltage feedback control element.

Divider unit 60 divides voltage Vb1 by target voltage Vh* and outputs the result of division to subtractor unit 62. Here, the result of division by divider unit 60, namely "voltage Vb1/target voltage Vh*" is an inverse of the theoretical voltage step-up ratio of voltage step-up converter 12-1. Subtractor unit 62 subtracts the output of proportional-integral control unit 58 from the output of divider unit 60 and outputs the result of subtraction as duty command Ton1 to modulation unit 64.

Modulation unit 64 generates an original signal of drive signal PWC1 based on duty command Ton1 and a carrier wave generated by an oscillator unit (not shown), and gate processing unit 65 outputs drive signal PWC1 to transistors Q1A, Q1B of voltage step-up converter 12-1 based on the original signal as well as block command CSDN1 and upper-arm ON command U-ON1.

Here, duty command Ton1 that is input to modulation unit 64 corresponds to the ON duty ratio of transistor Q1B that is a component of the upper arm of voltage step-up converter 12-1, and the value of the duty command ranges from 0 to 1. Voltage step-up converter 12-1 is controlled such that the voltage step-up ratio is lower as duty command Ton1 is larger and the voltage step-up ratio is higher as duty command Ton1 is smaller.

Converter control unit 32-2 includes subtractor units 67, 72, a proportional-integral control unit 69, a divider unit 70, a modulation unit 74, and a gate processing unit 75.

Subtractor unit 67 subtracts I measured by the current sensor from current command value I* that is output from HV-ECU 31, and outputs the result of subtraction to proportional-integral control unit 69. Proportional-integral control unit 69 uses a difference between current command value I* and measured value I as an input to perform proportional integration thereon, and outputs the result of proportional integration to subtractor unit 72.

Divider unit 70 divides voltage Vb2 by target voltage Vh*, and outputs the result of division to subtractor unit 72. Here, the result of division by divider unit 70, namely "voltage Vb2/target voltage Vh*" is an inverse of the theoretical voltage step-up ratio of voltage step-up converter 12-2. Subtractor unit 72 subtracts the output of proportional-integral control unit 69 from the output of divider unit 70, and outputs the result of subtraction as duty command Ton2.

Modulation unit 74 generates an original signal of drive signal PWC2 based on duty command Ton2 and a carrier wave generated by an oscillator unit (not shown), and gate processing unit 75 outputs drive signal PWC2 to transistors Q2A, Q2B of voltage step-up converter 12-2 based on the original signal as well as block command CSDN2 and upper-arm ON command U-ON2.

Here, duty command Ton2 that is input to modulation unit 74 corresponds to the ON duty ratio of transistor Q2B that is a component of the upper arm of voltage step-up converter 12-2, and the value of the duty command ranges from 0 to 1. Voltage step-up converter 12-2 is controlled such that the voltage step-up ratio is lower as duty command Ton2 is larger and the voltage step-up ratio is higher as duty command Ton2 is smaller.

FIG. 5 is a diagram illustrating an operation of converter control unit 32-2 in FIG. 4.

Referring to FIGS. 4 and 5, converter control unit 32-2 receives from HV-ECU 31, gate block command CSDN2, upper-arm ON command U-ON2 and voltage step-up command value Vh* as inputs, and controls the gate of transistor Q2B of the upper arm and the gate of transistor Q2A of the lower arm of voltage step-up converter 12-2.

Firstly, in the case where gate block command CSDN2 is valid, transistors Q2A, Q2B are fixed in the OFF state regardless of the states of upper-arm ON command U-ON2 and voltage step-up command value Vh*. This state is herein referred to as "gate block state." In the gate block state, upper-arm ON flag F2 set in gate processing unit 75 is set to zero.

Secondly, in the case where gate block command CSDN2 is invalid, the states of transistors Q2A, Q2B can be changed according to the states of upper-arm ON command U-ON2 and voltage step-up command value Vh*. At this time, if upper-arm ON command U-ON2 is valid, transistor Q2B is fixed in the ON state and transistor Q2A is fixed in the OFF state regardless of the setting of voltage step-up command value Vh*. Accordingly, in FIG. 1, main positive bus MPL and positive line PL2 are connected via inductor L2 in voltage step-up converter 12-2. This state is herein referred to as "upper-arm ON state." In the upper-arm ON state, upper-arm ON flag F2 set in gate processing unit 75 is set to 1.

Finally, in the case where gate block command CSDN2 is invalid and upper-arm ON command U-ON2 is invalid, ON/OFF switching of transistors Q2A, Q2B is controlled with the duty ratio according to voltage step-up command value Vh*. In this state, upper-arm ON flag F2 set in gate processing unit 75 is set to 0.

Gate processing unit 75 in FIG. 4 is configured such that the operation as shown in FIG. 5 is implemented. Here, the description above is applied similarly to gate processing unit 65, and thus the detailed description will not be repeated here.

FIG. 6 is a flowchart illustrating control performed by HV-ECU 31 in FIG. 3. Here, the process shown in the flowchart is called from a main routine and executed at certain time intervals or when a predetermined condition is satisfied.

As shown in FIG. 6, HV-ECU 31 performs upper-arm ON implementation control in step S1, upper-arm ON cancellation control in step S2 and balance charging control in step S3 in order, and subsequently the control proceeds to the main routine in step S4. In the following, steps S1 to S3 will be described in detail one by one.

FIG. 7 is a diagram showing a change in state of charge SOC of batteries B1, B2 when charging from an external source is performed.

In FIG. 7, at time t0, a power supply plug is inserted externally into the connector of the charger in FIG. 1. Then, in time t0 to t1, a charging system is started. At this time, respective states of charge of batteries B1, B2 are both SOC-MIN. Charging is started at time t1 and ended at time t4. In the charging period from time t1 to time t4, voltage step-up converter 12-1 is controlled such that the converter is in the gate block state while voltage step-up converter 12-2 is controlled such that the converter is in the upper-arm ON state from time t1 to time t2.

Figure 8:
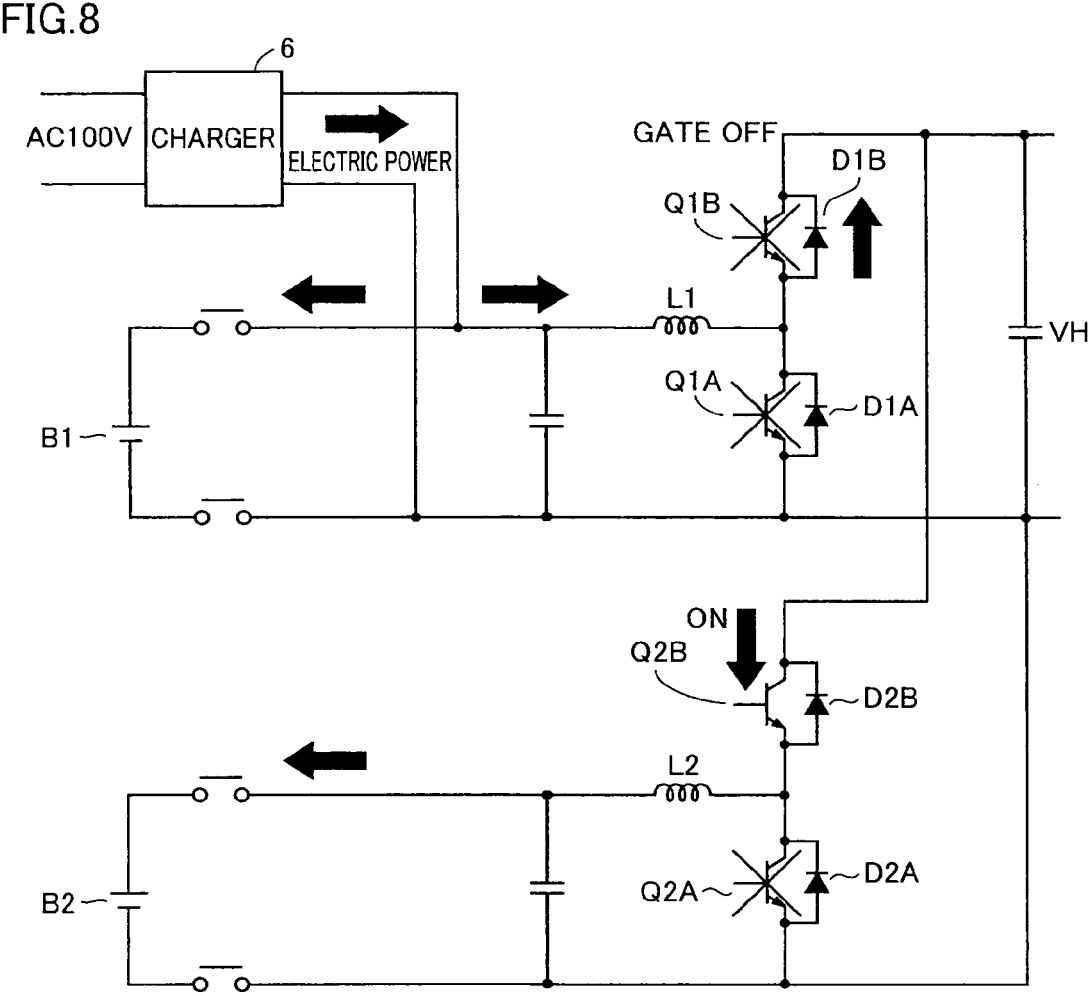
FIG. 8 is a diagram conceptually showing a flow of a charging power from time t1 to time t2 in FIG. 7.

FIG. 8 conceptually shows a flow of a charging power from time t1 to time t2 in FIG. 7.

As shown in FIG. 8, the electric power from charger 6 is supplied to battery B1 and is also supplied to transistor Q2B via diode D1B while voltage Vh is lower than the output voltage of charger 6. Since transistor Q2B is conductive in the upper-arm ON state, the electric power from charger 6 is also supplied to battery B2.

Thus, while voltage step-up converter 12-1 is set in the gate block state and voltage step-up converter 12-2 is set in the upper-arm ON state, a switching loss of a power element in voltage step-up converters 12-1, 12-2 does not occur, so that efficient charging can be performed.

Figure 9:
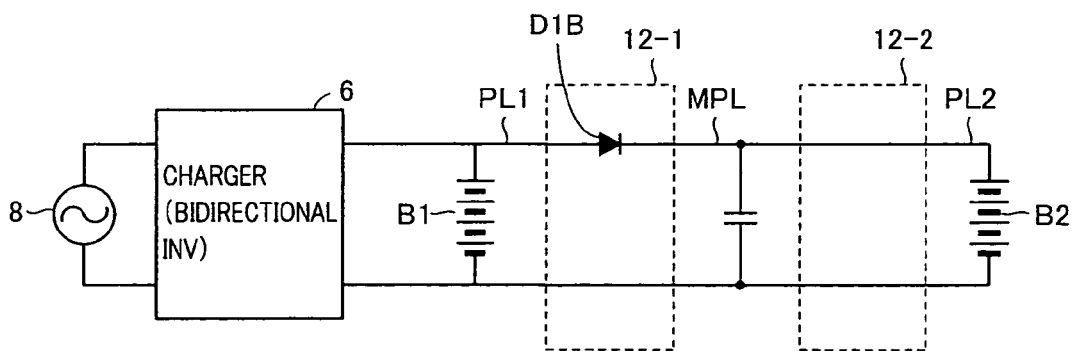
FIG. 9 is a diagram showing the state in FIG. 7 in more simplified form.

FIG. 9 shows the state in FIG. 7 in more simplified form.

As shown in FIG. 9, the electric power supplied from an AC power supply such as commercial power supply is converted by charger 6 into DC and adjusted for use as charging voltage. In voltage step-up converter 12-1 controlled in the gate block state, positive line PL1 and main positive bus MPL are connected by diode D1B. In voltage step-up converter 12-2 controlled in the upper-arm ON state, main positive bus MPL and positive line PL2 are connected. Here, because of the presence of diode D1B, battery B1 is charged in slight preference to battery B2 as shown in FIG. 7. With the state: SOC(B1) >SOC(B2) maintained, states of charge SOC(B1) and SOC (B2) increase.

Figure 10:
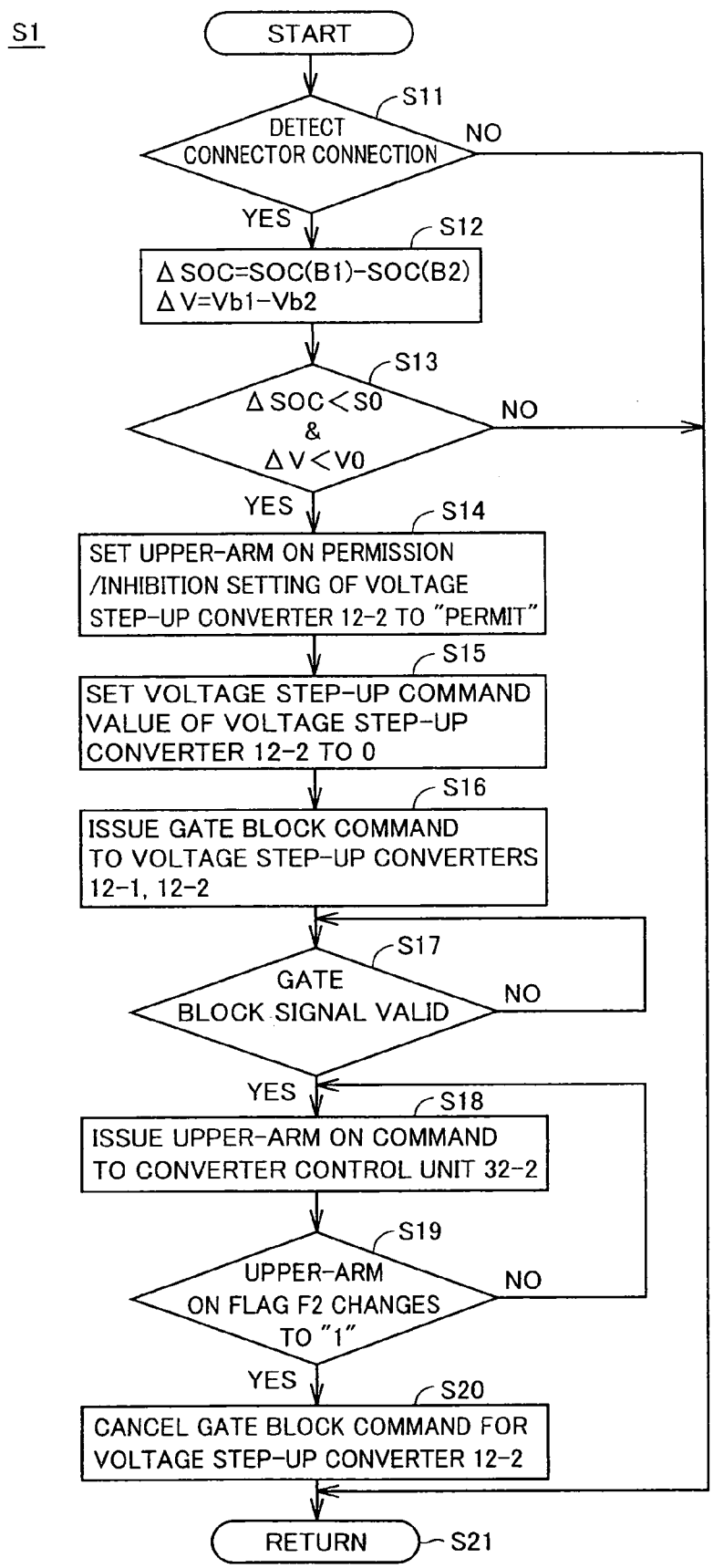
FIG. 10 is a flowchart showing details of upper-arm ON implementation control in step S1 of FIG. 6.

FIG. 10 is a flowchart showing details of the upper-arm ON implementation control in step S1 of FIG. 6.

Referring to FIG. 10, the process is started and then HV-ECU 31 detects whether or not a plug from an external power supply is connected to the connector of charger 6. When the plug is not connected to the connector, the process proceeds to step S21 and the control returns to the flowchart in FIG. 6.

When it is detected in step S11 that the plug is connected to the connector, difference $\Delta SOC$ between respective SOCs of batteries B1 and B2 and difference $\Delta V$ between respective voltages of batteries B1 and B2 are calculated based on expressions (1) and (2) below in step S12.

$$\Delta SOC = SOC(B1) - SOC(B2) \quad (1)$$

$$\Delta V = Vb1 - Vb2 \quad (2)$$

In step S13, it is determined whether or not $\Delta SOC$ is smaller than predetermined value S0 and $\Delta V$ is smaller than predetermined value V0.

When $\Delta SOC$ is equal to or larger than the predetermined value or $\Delta V$ is equal to or larger than the predetermined value, an excessive electric current could flow from battery B1 to battery B2. In view of this, when one of the conditions $\Delta SOC<S0$ and $\Delta V<V0$ is not satisfied in step S13, the process proceeds to step S21 and the control returns to the flowchart in FIG. 6.

When both of the conditions $\Delta SOC<S0$ and $\Delta V<V0$ are satisfied in step S13, the upper-arm ON permission/inhibition setting of voltage step-up converter 12-2 that is set in HV-ECU 31 is set to "PERMIT" in step S14. When this upper-arm ON permission/inhibition setting is set to "INHIBIT," HV-ECU 31 will not make upper-arm ON command U-ON2 valid.

In step S15, the voltage step-up command for voltage step-up converter 12-2 is set to zero. The zero setting of the voltage step-up command value can avoid any abnormal operation even if upper-arm ON command U-ON2 is cancelled after any malfunction or the like.

In step S16, for both of voltage step-up converters 12-1, 12-2, the gate block command is set valid. In step S17, the output of HV-ECU 31 is monitored, and it is confirmed in step S17 whether or not a signal corresponding to "VALID" gate block command is actually sent to converter control units 32-1, 32-2. While a signal change corresponding to "VALID" gate block command cannot be identified in the output, step S17 is performed again and the process enters waiting. When a signal change corresponding to "VALID" gate block command is identified in the output, the process proceeds from step S17 to step S18.

In step S18, HV-ECU 31 outputs to converter control unit 32-2 "VALID" upper-arm ON command U-ON2. In step S19, HV-ECU 31 reads from converter control unit 32-2 upper-arm ON flag F2 and confirms whether the value of the flag becomes "1" or not. When upper-arm ON flag F2 has not become "1," the process in step S18 is performed again.

When it is confirmed that upper-arm ON flag F2 has become "1" in step S19, the process proceeds to step S20 where HV-ECU 31 cancels gate block command CSDN2 for voltage step-up converter 12-2. Accordingly, converter control unit 32-2 becomes the upper-arm ON state in FIG. 5. After this, the process proceeds step S21 and the control proceeds to the flowchart in FIG. 6.

Figure 11:
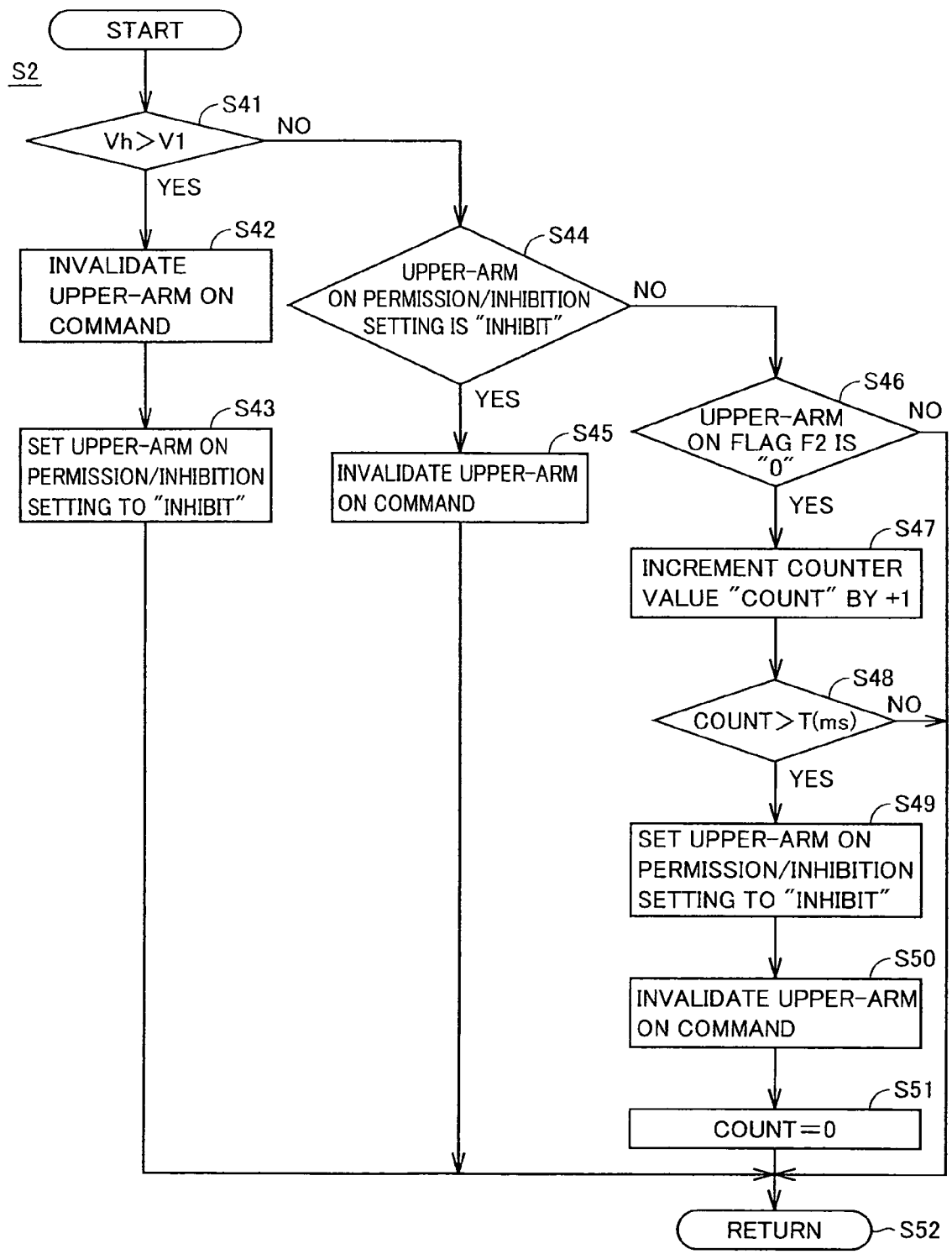
FIG. 11 is a flowchart showing details of a process for upper-arm cancellation control in step S2 of FIG. 6.

FIG. 11 is a flowchart showing details of the process of the upper-arm ON cancellation control in step S2 of FIG. 6.

Referring to FIG. 11, in step S41, it is confirmed whether or not voltage Vh measured by voltage sensor 13 becomes larger than predetermined threshold value V1. When voltage Vh is larger than threshold value V1, the voltage of the main positive bus is considered to be abnormally high due to some factor. Thus, in step S42, upper-arm ON command U-ON2 is invalidated. Further, in step S43, the upper-arm ON permission/inhibition setting is set to "INHIBIT." Accordingly, the upper-arm ON state is cancelled and the control is returned to the flowchart of FIG. 6 in step S52.

When Vh>V1 is not satisfied in step S41, the process proceeds to step S44. In step S44, it is confirmed whether or not the upper-arm ON permission/inhibition setting is set to "INHIBIT" for any reason detectable by HV-ECU 31 such as forced termination of charging. When it is found that the upper-arm ON permission/inhibition setting is set to "INHIBIT" in step S44, upper-arm ON command U-ON2 is invalidated in step S45. Accordingly, the upper-arm ON state is cancelled and the control is returned to the flowchart of FIG. 6 in step S52.

When it is confirmed in step S44 that the upper-arm ON permission/inhibition setting is not set to "INHIBIT," the process proceeds to step S46. In step S46, it is determined whether or not upper-arm ON flag F2 in converter control unit 32-2 is "0." When it is confirmed in step S46 that upper-arm ON flag F2 is not "0" (namely "1"), it is unnecessary to cancel the upper-arm ON state and thus the process proceeds to step S52 without changing the setting.

When it is confirmed in step S46 that upper-arm ON flag F2 is "0," it is necessary to cancel the upper-arm ON state. This state corresponds to the case where an electric-current abnormality or the like is detected in converter control unit 32-2 through the process described hereinlater with reference to FIG. 12. In this case, the process proceeds to step S47. In step S47, count value COUNT counted for the purpose of preventing malfunction is incremented by one. When it is found in step S48 that count value COUNT is not larger than predetermined value T (ms), the process proceeds to step S52 and the control proceeds to the flowchart in FIG. 6 without canceling the upper-arm ON command, for the following reason. Even in the case for example where an abnormality is instantly detected in converter control unit 32-2, the abnormality will not be detected some time later and the original state could be recovered.

When the condition: count value COUNT>T is satisfied in step S48, the process proceeds to step S49. In step S49, the upper-arm ON permission/inhibition setting is set to "INHIBIT" in HV-ECU 31. Then, the process proceeds to step S50 where upper-arm ON command U-ON2 that is output from HV-ECU 31 to converter control unit 32-2 is invalidated. In step S51, count value COUNT is set to zero and accordingly reset.

Figure 12:
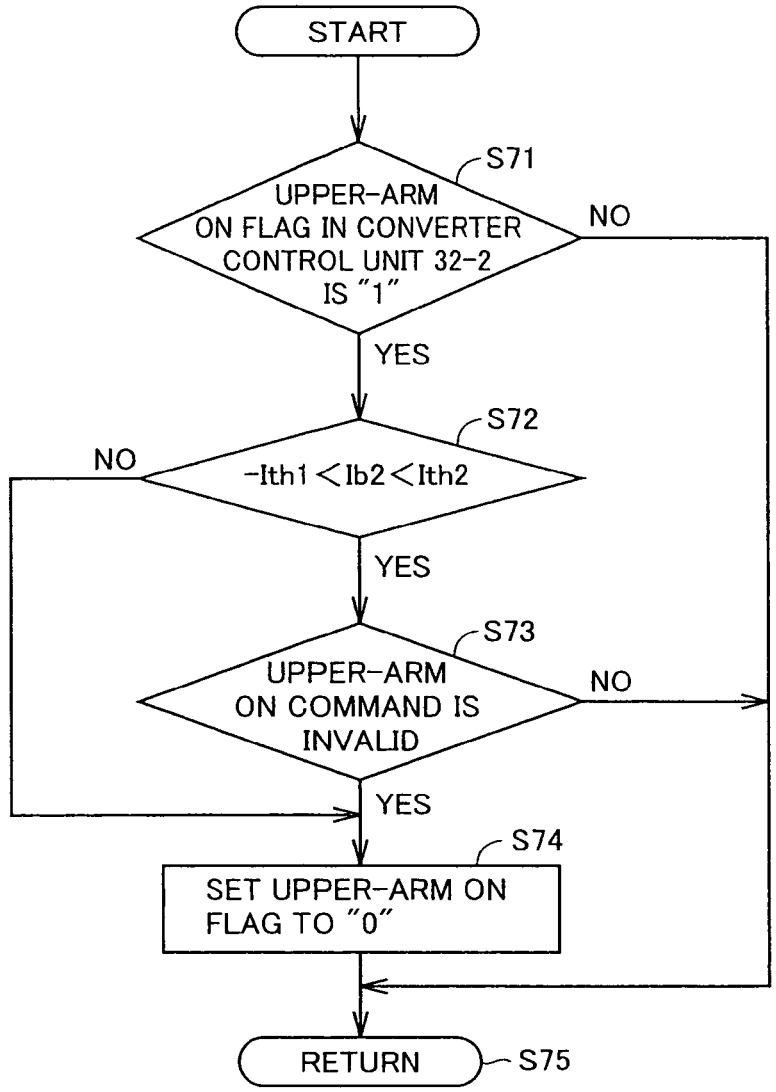
FIG. 12 is a flowchart illustrating a process for changing upper-arm ON flag F2 in converter control unit 32-2.

FIG. 12 is a flowchart illustrating a process for changing upper-arm ON flag F2 in converter control unit 32-2. The change of upper-arm ON flag F2 is monitored by HV-ECU 31 in step S46 of FIG. 11. In converter control unit 32-2, the process shown in the flowchart of FIG. 12 is called from the main routine of the control of converter control unit 32-2 at certain time intervals or each time a predetermined condition is satisfied, and performed repeatedly.

Referring to FIG. 12, the process is started and it is determined in step S71 whether upper-arm ON flag F2 in converter control unit 32-2 is "1" or not. When upper-arm ON flag F2 is "1," converter control unit 32-2 controls voltage step-up converter 12-2 such that the converter is in the upper-arm ON state.

When it is determined in step S71 that upper-arm ON flag F2 is "0," the process proceeds to step S75 where the control proceeds to the main routine. In contrast, when it is determined in step S71 that upper-arm ON flag F2 is "1," the process proceeds to step S72.

In step S72, it is determined whether or not charging current Ib2 for battery B2 is within a normal range. In step S72, it is confirmed whether or not battery B2 generates heat due to an excessively increased charging/discharging current, or the charging/discharging current is apparently abnormal value. When the condition: −Ith1<Ib2<Ith2 is satisfied in step S72, the process proceeds to step S73 where it is determined whether or not upper-arm ON command U-ON2 provided from HV-ECU 31 becomes invalid. When upper-arm ON command U-ON2 is still valid in step S73, a current abnormality has not occurred and an instruction to cancel the upper-arm ON is not given from the ECU of a higher level. Therefore, with the current control maintained, the process proceeds to step S75 and the control proceeds to the main routine.

When it is found that the electric current value is an abnormal value and accordingly condition: −Ith1<Ib2<Ith2 is not satisfied in step S72, or when upper-arm ON command U-ON2 provided from HV-ECU 31 is made invalid in step S73, the process proceeds to step S74 and converter control unit 32-2 sets upper-arm ON flag F2 to "0." After this, the control proceeds to the main routine in step S75.

Figure 13:
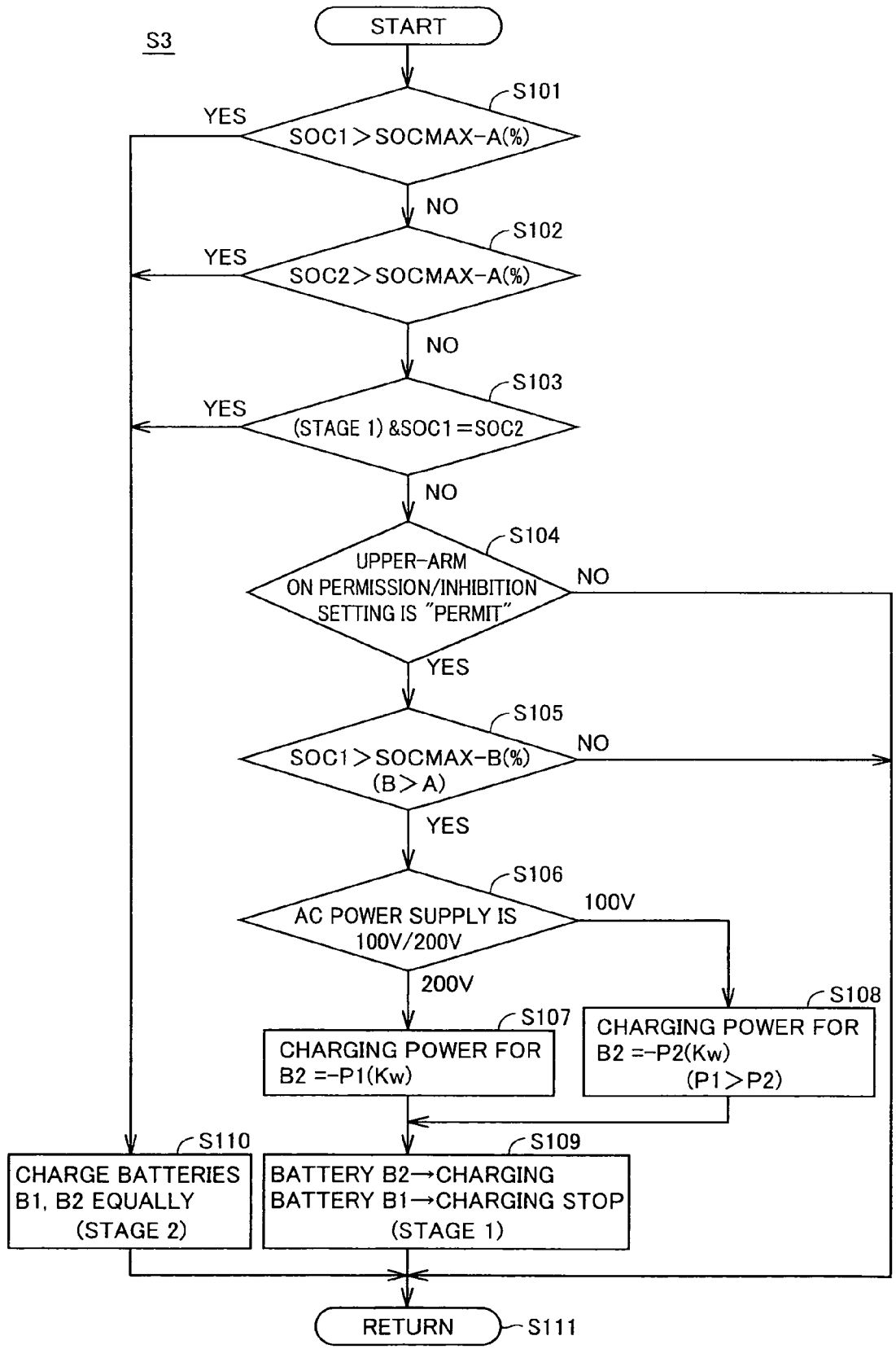
FIG. 13 is a flowchart showing details of balance charging control performed in step S3 of FIG. 6.

FIG. 13 is a flowchart showing details of the balance charging control performed in step S3 of FIG. 6. The balance charging control is performed from time t2 to time t4 in FIG. 7 to cause respective states of charge of battery B1 and battery B2 to reach respective target values that are almost identical to each other.

Referring to FIG. 13, it is determined in step S101 whether or not battery B1 is charged to have state of charge SOC1 that is almost close to charging target value SOCMAX(SOCMAX−A (%)). When the state of charge of battery B1 is not larger than SOCMAX−A (%) in step S101, it is further determined in step S102 whether or not battery B2 is charged to have state of charge SOC2 that is almost close to charging target value SOCMAX. When the state of charge of battery B2 is not larger than SOCMAX−A (%) in step S102, the process proceeds to step S103. The case where the process proceeds to step S103 is the case in FIG. 7 where charging is performed in the upper-arm ON state from time t1 to time t2, or the case in FIG. 7 where the state of charge of battery B2 is caused to become closer to battery B1 from time t2 to time t3.

In step S103, it is determined whether or not the charging stage for batteries B1, B2 is the stage indicated by STAGE 1 in FIG. 7 and respective states of charge SOC1, SOC2 of batteries B1, B2 are equal to each other. When this condition is satisfied, the state of charge of battery B2 becomes close to battery B1 and accordingly batteries B1, B2 may be charged equally. Thus, the process proceeds to step S110. When the condition in step S103 is not satisfied, it is necessary to cause the state of charge of battery B2 to further approach the state of charge of battery B1, and thus the process proceeds to step S104 for charging battery B2.

In step S104, it is determined whether or not the upper-arm ON permission/inhibition setting is "PERMIT." When the upper-arm ON permission/inhibition setting is not "PERMIT," namely "INHIBIT," the process proceeds from step S104 to step S111 and the control returns to the main routine. In this case, STAGE 1 of charging that is currently set from time t2 to time t3 in FIG. 7 and that is set in step S109 described hereinlater is continued.

When the upper-arm ON permission/inhibition setting is "PERMIT" in step S104, the process proceeds to step S105 where it is determined whether or not state of charge SOC1 of battery B1 is larger than predetermined value SOCMAX−B (%).

When the condition: SOC1>SOCMAX−B is not satisfied, the process proceeds from step S105 to step S111 and the control returns to the main routine. In this case, the charging method, which is currently performed from time t1 to time t2 in FIG. 7 and according to which voltage step-up converter 12-1 is set in the gate block state and voltage step-up converter 12-2 is set in the upper arm ON state, is continued.

In contrast, when the condition: SOC1>SOCMAX−B is satisfied in step S105, the process proceeds to step S106. In step S106, it is determined whether the AC power supply connected externally to charger 6 is 100 V or 200 V. When the AC power supply is 200 V, the process proceeds to step S107 where the charging power for charging battery B2 is set to −P1 (kw). Here, the minus sign is used for the case where the electric power is input to the battery, and the plus sign is used for the case where the electric power is output from the battery. In the case where the AC power supply is 100 V, in order to charge with smaller electric power as compared with the case where the AC power supply is 200 V, the process proceeds to step S108 where the charging power for charging battery B2 is set to −P2 (kw). Here, the condition P1>P2 is satisfied.

When the charging power for battery B2 is set in step S107 or step S108, the process proceeds to step S109. In step S109, voltage step-up converters 12-1, 12-2 are controlled such that battery B2 is charged with the set charging power and such that battery B1 is in the charging-stopped state where charging will not further proceed. For example, voltage step-up converters 12-1 and 12-2 may be controlled such that charger 6 is caused to output power P desired to charge battery B2 and battery B2 is charged with electric power equal to this electric power P in order that SOC of battery B1 may not increase. Specifically, current command value I* to be provided to subtractor 67 in FIG. 4 may be set based on power P from charger 6 and measured value Vb of voltage sensor 10-2, according to the operation: I*=P/Vb, and Ib2 measured by current sensor 11-2 may be used as current value I to be provided to subtractor 67.

As the process proceeds from step S109 to step S111, the control returns to the flowchart in FIG. 6. Charging in STAGE 1 of step S109 is performed from time t2 to time t3 in FIG. 7.

As the charging further proceeds, any of the conditions in step S101 to step S103 is satisfied. FIG. 7 shows an example where the condition SOC1>SOC2 is satisfied in a previous determination routine while the condition SOC1<SOC2 is satisfied this time because of the timing at which the determination is made, so that STAGE 1 is ended under the condition of step S102. Accordingly, the process proceeds to step S110 and the process of STAGE 2 is performed to charge batteries B1, B2 almost equally. For example, in FIG. 4, the same value as measured value I may be used as current command value I* for converter control unit 32-2. As Ton2 is determined by the voltage ratio, voltage step-up converters 12-1, 12-2 are controlled in a substantially similar manner. Here, converter control units 32-1, 32-2 may be configured such that voltage control, current control, electric power control, a combination of them or the like can be performed so as to carry out control for making charging currents Ib1, Ib2 of batteries B1, B2 equal to each other, making voltages or charging powers equal to each other.

The present embodiment heretofore described will be generally described with reference to FIG. 1 and some other drawings. Vehicle 1 includes first and second chargeable and dischargeable power storage devices (batteries B1, B2), a load device (inverters 14, 22, motor generators MG1, MG2), a bus (main positive bus MPL, main negative bus MNL) for supplying electric power to the load device, first and second voltage conversion devices (voltage step-up converters 12-1, 12-2) provided in association with the first and second power storage devices respectively and each connected between respective associated power storage device and the bus, a charging line (PCL) for supplying electric power provided from outside the vehicle to a connection point of the first power storage device and the first voltage conversion device, and a control device (30) controlling the first and second power storage devices. When external charging from an external source via the charging line is started, the control device causes the first voltage conversion device to perform a rectifying operation for supplying an electric current from the charging line to the bus in a case where a voltage of the bus is lower than a voltage of the charging line, and causes the second voltage conversion device to connect the bus and the second power storage device.

As shown in FIG. 2, preferably the first and second voltage conversion devices (voltage step-up converters 12-1, 12-2) each include a chopper circuit (40-1, 40-2) having an upper arm where a switching element and a rectifying element are connected in parallel. When the external charging is started, the control device (30) fixes the switching element (Q1B) in the first voltage conversion device in a non-conductive state and fixes the switching element (Q2B) in the second voltage conversion device in a conductive state.

More preferably, the bus includes a positive bus (MPL) and a negative bus (MNL). The chopper circuit (40-1, 40-2) further includes an inductor (L1, L2) having one end connected to a positive electrode of the associated power storage device, and a lower arm (Q1A, D1A, Q2A, D2A) connected between the other end of the inductor and the negative bus. The upper arm is connected between the other end of the inductor (L1, L2) and the positive bus (MPL). The rectifying element (D1B) has a forward direction from the other end of the inductor toward the positive bus (MPL), and provided in parallel with the switching element (Q1B).

As shown in FIG. 7, preferably, when a state amount (SOC (B1)) indicating a state of charge of the first power storage device is closer to a full charge state relative to a first predetermined value (SOCMAX-B) after the external charging is started, the control device (30) causes the second voltage conversion device (12-2) to operate such that a state amount (SOC(B2)) indicating a state of charge of the second power storage device increases.

More preferably, when the state amount indicating the state of charge of at least one of the first and second power storage devices is closer to the full charge state relative to a second predetermined value (SOCMAX-A) after the external charging is started, the control device causes the first and second voltage conversion devices to operate together such that the states of first and second power storage devices are equal to each other. The second predetermined value (SOCMAX-A) indicates a state amount closer to the full charge state relative to the first predetermined value (SOCMAX-B).

As shown in FIG. 1, preferably the load device includes an electric motor (MG1, MG2) used for driving the vehicle, and the vehicle further includes an internal combustion engine (engine 4) used together with the electric motor for driving the vehicle.

More preferably, a charger (6) is further included that is configured to be connectable to a power supply (8) outside the vehicle, and converts electric power received from the power supply to generate a charging voltage on the charging line.

With the above-described configuration and control employed, a loss can be kept low when external charging is performed.

The invention disclosed in the present embodiment is applicable as well to any vehicle configured differently, as long as the vehicle is mounted with a power storage device that can be charged from an external source. For example, the invention disclosed in the present embodiment is applicable to a series hybrid vehicle or parallel hybrid vehicle without using the power split device, and also applicable to an electric vehicle without being mounted with an engine.

It should be construed that embodiments disclosed herein are by way of illustration in all respects, not by way of limitation. It is intended that the scope of the present invention is defined by claims, not by the description above, and includes all modifications and variations equivalent in meaning and scope to the claims.

The invention claimed is:
1. A vehicle comprising:
a first chargeable and dischargeable power storage device;
a second chargeable and dischargeable power storage device;
a load device;

an electric power line, the electric power line supplying an electric power to the load device;

a first voltage conversion device and a second voltage conversion device, the first and the second voltage conversion devices being provided in association with the first and the second power storage devices respectively and each connected between respective associated power storage device and the electric power line;

a charging line, the charging line supplying an electric power provided from outside the vehicle to a connection point of the first power storage device and the first voltage conversion device; and a control device, the control device controlling the first voltage conversion device and the second voltage conversion device, wherein while external charging from an external source via the charging line is performed, when a voltage of the electric power line is lower than a voltage of the charging line, the control device causes the first voltage conversion device to perform a rectifying operation for supplying an electric current from the charging line to the electric power line, and causes the second voltage conversion device to connect the electric power line and the second power storage device.

2. The vehicle according to claim 1, wherein each of the first voltage conversion device and the second voltage conversion device includes a chopper circuit having an upper arm where a switching element and a rectifying element are connected in parallel, while the external charging is performed, the control device fixes the switching element in the first voltage conversion device in a non-conductive state and fixes the switching element in the second voltage conversion device in a conductive state.

3. The vehicle according to claim 2, wherein the electric power line includes a positive bus and a negative bus, and the chopper circuit further includes:

an inductor having one end connected to a positive electrode of the associated power storage device; and a lower arm connected between the other end of the inductor and the negative bus, the upper arm is connected between the other end of the inductor and the positive bus, and the rectifying element has a forward direction from the other end of the inductor toward the positive bus, and the rectifying element is provided in parallel with the switching element.

4. The vehicle according to claim 1, wherein when a state amount indicating a state of charge of the first power storage device is closer to a full charge state relative to a first predetermined value while the external charging is performed, the control device causes the second voltage conversion device to operate such that a state amount indicating a state of charge of the second power storage device increases.

5. The vehicle according to claim 4, wherein when the state amount indicating the state of charge of at least one of the first and second power storage devices is closer to the full charge state relative to a second predetermined value while the external charging is performed, the control device causes the first and second voltage conversion devices to operate together such that the states of the first and second power storage devices are equal to each other, and the second predetermined value indicates a state amount closer to the full charge state relative to the first predetermined value.

6. The vehicle according to claim 1, wherein the load device includes an electric motor used for driving the vehicle, and the vehicle further comprises an internal combustion engine used together with the electric motor for driving the vehicle.

7. The vehicle according to claim 6, further comprising a charger configured to be connectable to a power supply outside the vehicle and converting electric power received from the power supply to generate a charging voltage on the charging line.

* * * * *